US007603706B2

(12) United States Patent
Donnelly et al.

(10) Patent No.: US 7,603,706 B2
(45) Date of Patent: Oct. 13, 2009

(54) SYSTEM SECURITY USING HUMAN AUTHORIZATION

(75) Inventors: Austin Donnelly, Trumpington (GB); Dinan Gunawardena, Trumpington (GB); Alf Zugenmaier, Munich (DE); Jacob Scott, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 11/172,264

(22) Filed: Jun. 30, 2005

(65) Prior Publication Data

US 2007/0006302 A1    Jan. 4, 2007

(51) Int. Cl.
*G06F 11/00* (2006.01)
*H04L 9/00* (2006.01)
(52) U.S. Cl. ............................. 726/22; 726/26; 726/27
(58) Field of Classification Search .................. 726/2–5, 726/16–19, 27, 22, 26; 713/168–170, 173, 713/182, 186; 382/115–118, 124
See application file for complete search history.

(56) References Cited

U.S. PATENT DOCUMENTS

| 5,229,764 | A | * | 7/1993 | Matchett et al. ............ 340/5.52 |
| 5,615,277 | A | * | 3/1997 | Hoffman ..................... 382/115 |
| 6,079,021 | A | | 6/2000 | Abadi et al. |
| 6,195,698 | B1 | | 2/2001 | Lillibridge et al. |
| 2003/0204569 | A1 | | 10/2003 | Andrews et al. |
| 2004/0059951 | A1 | | 3/2004 | Pinkas et al. |
| 2004/0073813 | A1 | | 4/2004 | Pinkas et al. |
| 2004/0093371 | A1 | | 5/2004 | Burrows et al. |
| 2004/0250107 | A1 | | 12/2004 | Guo |
| 2004/0254793 | A1 | | 12/2004 | Herley et al. |
| 2005/0066201 | A1 | | 3/2005 | Goodman et al. |

OTHER PUBLICATIONS

Yong Rui and Zicheng Liu, "ARTiFACIAL: Automated Reverse Turing test using FACIAL features", ACM Multimedia Systems Journal (Springer) May 2004.
Luis Von Ahn, Manuel Blum, Nicholas J. Hopper, and John Langford, "CAPTCHA: Using Hard AI Problems For Security", Carnegie Mellon University and IBM T.J. Watson Research Center, USA, Proceedings of Eurocrypt (2003).
A.M. Turing, "Computing Machinery and Intelligence", A.M. Turing (1950) Computing Machinery and Intelligence. Mind 49:433-460.
Dinan Gunawardena, Jacob Scott, Alf Zugenmaier, and Austin Donnelly, "Countering Automated Exploits with System Security CAPTCHAS", Thirteenth International Workshop on Security Protocols, Cambridge, England (Apr. 22, 2005).
Henry Baird, "Image Understanding & Web Security", Palo Alto Research Center, DIAR, Jun. 21, 2003.
Benny Pinkas and Tomas Sander, "Securing Passwords Against Dictionary Attacks", HP Labs (2002).
Luis Von Ahn, Manuel Blum, and John Langford, "Telling Humans and Computers Apart Automatically", Communications of the ACM, Feb. 2004, vol. 47, No. 2, pp. 57-60.

* cited by examiner

*Primary Examiner*—Hosuk Song

(57) ABSTRACT

In response to the occurrence of a restricted event in a computing device, a user of the computing device is presenting with a challenge including information designed to assist in determining whether the challenge is answered by a human. If it is determined that the challenge was not answered by a human, the restricted event is counteracted.

19 Claims, 5 Drawing Sheets

SYSTEM SECURITY USING HUMAN AUTHORIZATION

BACKGROUND

The Internet has made it very easy and popular for ordinary computer users to download executable content, such as programs, processes, scripts, ActiveX controls, applets, etc., to computing devices. In many cases, this executable content may be downloaded and executed via the Internet without the user realizing that such an event took place. Unfortunately, such executable content is often malicious. For example, executable content may intentionally modify security critical parameters on a computing device, thus leaving the computing device open to exploitation by external processes.

SUMMARY

Various technologies are described herein for preventing or mitigating unauthorized access to information and functionality in a computing device by malicious executable content using a challenge designed to distinguish between a human and an automated process. In accordance with one implementation of the described technologies, when modification of specified information in a computing device is detected, a user of the computing device is presented with a challenge that includes information that may be used to determine whether the challenge is answered by a human or by an automated process. Based on the response to the challenge, the change to the specified information is either allowed or reversed.

In another implementation of the described technologies, when an attempt is made to access designated functionality in a computing device, a user of the computing device is presented with a challenge including information that may be used to determine whether the challenge is answered by a human or by an automated process. Based on the response to the challenge, access to the designated functionality is either allowed or prevented.

This Summary is provided to introduce a selection of concepts from the Detailed Description below in a simplified form. This Summary is not intended to identify key features or essential features of the claimed subject matter, nor is it intended to be used as an aid in determining the scope of the claimed subject matter.

BRIEF DESCRIPTIONS OF THE DRAWINGS

DESCRIPTION

Figure 1:
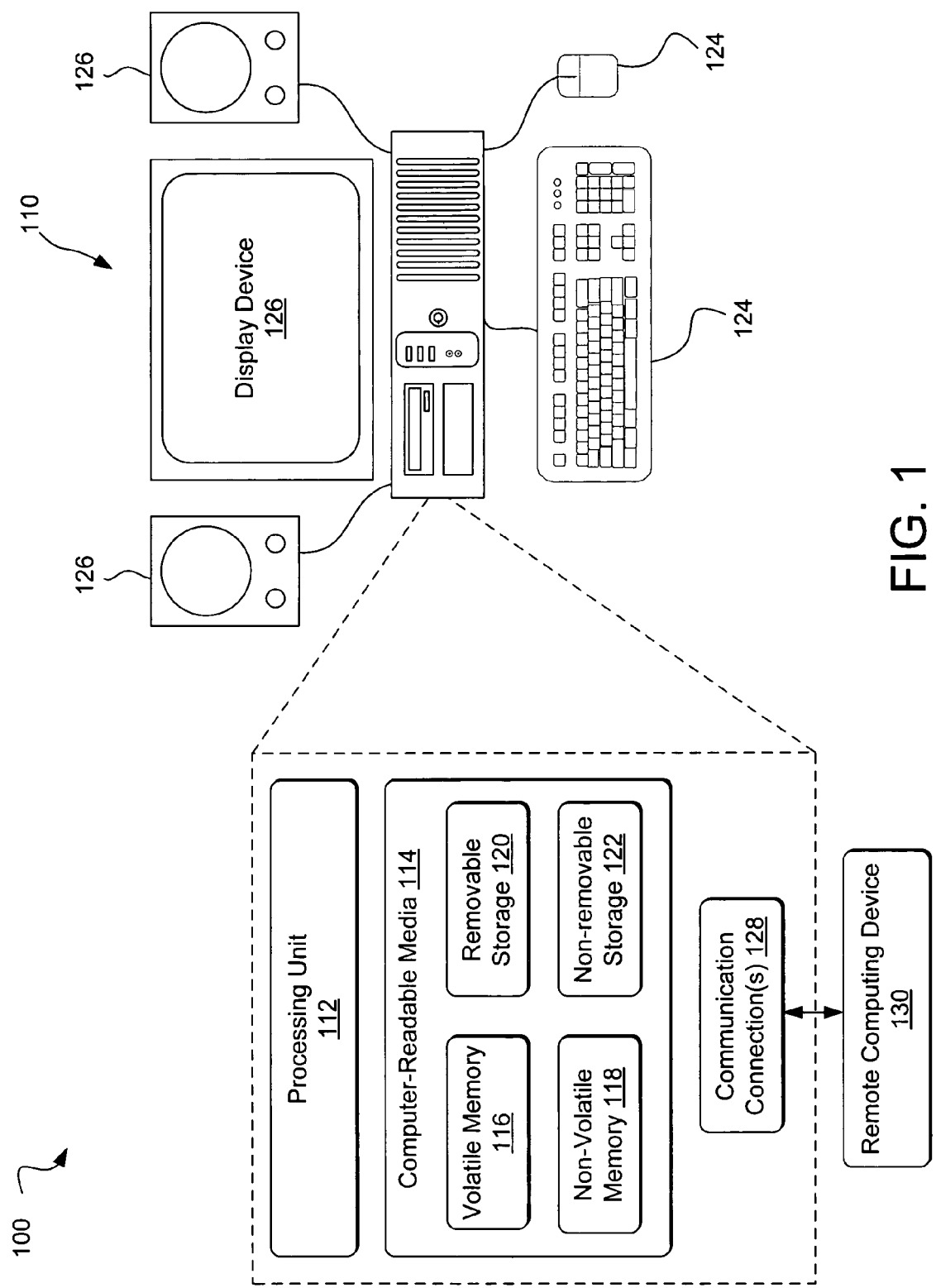
FIG. 1 illustrates on example of a suitable computing environment in which the technologies described herein may be implemented.

Described herein are various technologies for preventing, restricting, or mitigating modification to select information ("protected parameters") and functionality ("protected processes") in a computing device by malicious executable content using a challenge designed to distinguish between a human and an automated process. In accordance with various implementations of the technologies described herein, protected parameters and processes are monitored. If it is detected that a protected parameter has been modified or that a protected process has been called or invoked, a challenge is presented to the user of the computing device. The challenge that is presented to the user is constructed in such a way as to allow a determination to be made, based on a correct response to the challenge or an incorrect or lack of response to the challenge, whether the challenge was answered by a human. If it is determined that the challenge was answered by a human, the change to the protected parameter or the calling or invocation of the protected process is allowed, assuming that any other security requirements that may be imposed by the computing device for changing the protected parameter or calling or invoking the protected process have already been met (e.g., administrator privileges, etc.). If, however, it is determined that the challenge was not answered by a human, some action is taken to counteract or otherwise address the modification of the protected or the calling or invocation of the protected process. For example, and without limitation, the change to the protected parameter could be reversed, the call or invocation of the protected process could be prevented or otherwise mitigated, or some other action could be taken.

While the technologies described herein may be used to prevent or mitigate the modification of a wide variety and type information in a computing device, protected parameters will typically comprise information that is related to the security of the computing device. For example, and without limitation, in some embodiments protected parameters comprise a select subset of security related system configuration parameters of the computing device. In these embodiments, the protected processes may comprise processes (APIs, etc.) that include functionality for modifying the select subset of security related system configuration parameters.

In some implementations, a challenge is presented to the user of a computing device every time a protected parameter is changed or a protected process is called or invoked. However, as will be appreciated, in some cases this will create an undesirable experience for the user. For example, when software is being installed in a computing device, a significant number of parameter changes may need to be made. As such, in some implementations, various techniques or mechanisms are employed to selectively present challenges to the user.

One way to avoid burdening a user of the computing device with repeated challenges during the software installation process is to override the challenge presentation during software installation. However, simply overriding challenge presentations for all software installations may leave the computing device unacceptably vulnerable to malicious executable content. As such, in some implementations, challenge presentations are overridden only when it is determined that the software being installed is from a trusted source. For example, in one implementation, challenge presentations are overridden whenever a change in a configuration parameter or a call or invocation of a protected process is made in conjunction with the installation of software that is signed by a trusted authority.

In accordance with another implementation, changes to protected parameters and/or calls or invocations of protected processes are allowed to take place uninterrupted by the presentation of a challenge until some predetermined condition has been met. For example, and without limitation, in some implementations a credit based scheme is employed, wherein selected protected parameters each assigned a credit cost.

Each time one of the protected parameters is modified, the credit cost of the changed parameter is added to a parameter modification cost. When the parameter modification cost exceeds a predetermined threshold value, a challenge is presented to the user of the computing device. If it is determined that a human properly responded to the challenge, the modified parameters are maintained. However, if it is determined that the challenge was not answered by a human, one or more of the changed parameters are returned to their pre-changed value.

In accordance with yet another implementation, changes to protected parameters that are carried out by a given process are allowed to take place uninterrupted by the presentation of a challenge until the given process has completed. Once the given process has completed, a challenge is presented to the user of the computing device. If it is determined that a human properly responded to the challenge, the modified parameters are maintained. However, if it is determined that the challenge was not answered by a human, one or more of the changed parameters are returned to their pre-changed value.

Example Computing Environment

Turning now to FIG. 1, illustrated therein is an example of a suitable computing environment 100 in which the various technologies described herein may be implemented. It should be understood that computing environment 100 is only one example of a suitable computing environment in which the various technologies described herein may be employed and is not intended to suggest any limitation as to the scope of use or functionality of the technologies described herein. Neither should the computing environment 100 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, computing environment 100 includes a general purpose computing device 110. Components of computing device 110 may include, but are not limited to, a processing unit 112, computer readable media 114, input devices 124, output devices 126, and communications connections 128.

In general, processing unit 112 may comprise one or more general or special purpose processors, ASICs, or programmable logic chips that are operable to execute or embody computer-executable instructions. By way of example, and not limitation, computer-readable media 114 may comprise computer storage media and/or communication media. Computer storage media may include volatile media 116, nonvolatile media 118, removable storage 120 and/or non-removable storage 122, implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store data and/or computer-executable instructions.

Communication media typically embodies computer-executable instructions, data structures, program modules or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computing device 10 may include one or more input devices 124, through which a user may enter commands and information into computing device 110. Examples of input devices include, without limitation, a keyboard, a pointing device (e.g., a mouse), a tablet (electronic digitizer), a microphone, a trackball, a touch pad, or various other input devices. Computing device 110 may likewise include one or more output devices 126, through which a user receives information from computing device 110. Examples of output devices 126 include, but are not limited to, a display device, speakers, a printer, etc.

Computing device 10 may operate in a networked environment via one or more communications connections 128. Communications connections 128 may include or employ various hardware and software and may implementing various communications protocols, and the like, for facilitating between nodes (addressable entities) in a network. Network nodes may include, but are not limited to, personal computers, servers, routers, peer devices, peripheral devices, etc., and may include many or all of the elements described above relative to the computing device 108. For example, FIG. 1 shows computing device 110 being connected to a single remote computing device 130 via communications connections 128. However, it will be appreciated that computing device 10 may be connected to any number of nodes in a network.

Figure 2:
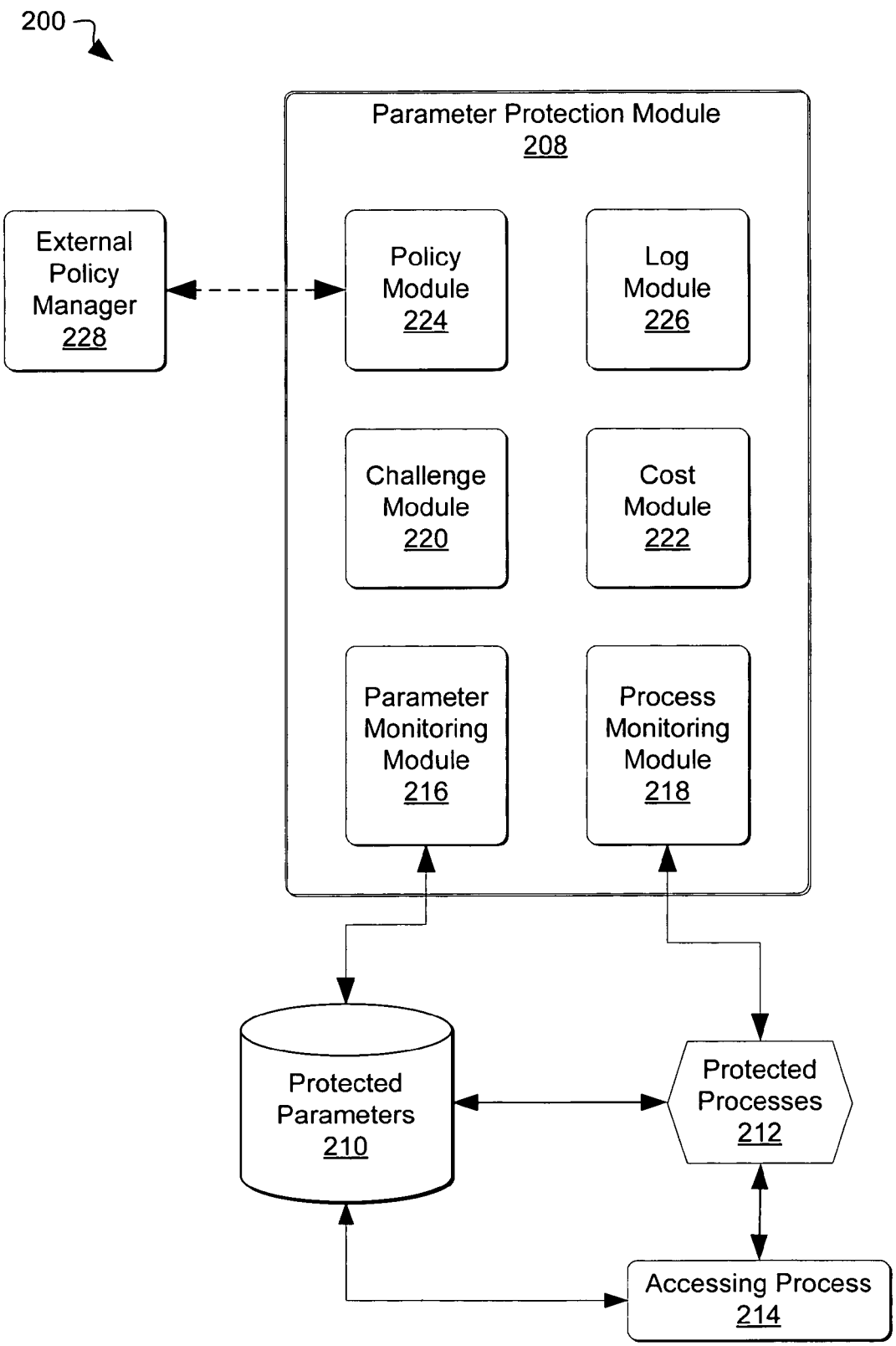
FIG. 2 illustrates one implementation of a parameter protection module.

Turning now to FIG. 2, shown therein is a system 200 for preventing or mitigating access to protected parameters 210 and/or protected processes 212 in computing device 110. In the following discussion, the features and functions of system 200 are described as being implemented as software modules executed in computing device 110. However, it should be appreciated and understood that system 200 may be implemented in any number of other systems, in software, hardware, and/or firmware. Additionally, it should be understood that while the functionality of system 200 is described as being distributed in a particular manner between various modules, in other embodiments this functionality may be distributed differently, either between one or more, or all of modules, or by other modules within and/or outside of the context of the system 200.

As shown, system 200 includes protected parameters 210, protected processes 212, an accessing process 214, a parameter protection module 208, and an external policy manager 228. Parameter protection module 208 includes a parameter monitoring module 216, a process monitoring module 218, a challenge module 220, a cost module 222, a policy module 224, and a log module 226.

Any or all of the modules 216-226 of the parameter protection module 208 may be a part of a trusted computing base of the computing device. As used herein, the phrase "trusted computing base" refers to all protection mechanisms within computing device 110 (e.g., hardware, firmware, and/or software), the combination of which is responsible for enforcing a security policy within computing device 110.

In general, a protected parameter may be any type of information that is stored in some form of computer-readable media within, or accessible by, computing device 110. For example, and without limitation, protected parameters 210 may comprise all or portions of files, libraries, components, objects, programs, dynamic linked libraries (DLLs), data structures, database entries, etc. However, in accordance with some of the implementations described herein, protected parameters 210 comprise system configuration parameters.

As used herein, system configuration parameters comprise parameters (e.g., properties, settings, and other information) that are used by an operating system and/or applications running on computing device 110 to perform various functions. In accordance with some operating systems, such as various operating systems from Microsoft® Corporation of Redmond, Wash., such configuration parameters are stored in a hierarchical file structure referred to as the "registry." In other operating systems, configuration parameters are stored in other ways, such as in other structures or files. As such, the term "configuration parameters" is used generally herein to indicate any such configuration parameters, regardless of the operating system used to access or manage the information.

In accordance with some implementations, protected parameters 210 comprises registry entries that have been identified as being particularly relevant to the security or integrity of computing device 110. Examples of such registry entries include, but are not limited to, registry entries related to firewall configuration settings, virus protection settings, the installation of software, security permissions, non-sandboxed resources, telephone dialer software, TCP connections, Remote Access Services (RAS), file system access, system activation, and/or enabling or disabling any or all of the technologies described herein for preventing or mitigating modification to protected parameters.

In general, a protected process 212 may be any type of process that has functionality for modifying protected parameters 210. However, protected processes 212 will typically comprise a subset of the Application Programming Interfaces (APIs) in computing device 110 that have functionality for modifying protected parameters 210. For example, protected processes 212 may comprise some subset of the APIs in computing device 110 that require administrator level privileges to invoke. Alternatively or in addition, protected processes 212 may comprise some subset of APIs in computing device 110 that are designated as protected with respect to a trusted computing base of computing device 110. Alternatively or in addition, protected processes 212 may comprise processes in the computing device 110 that are used to uninstall software. For example, and without limitation, protected processes 212 may include processes that uninstall virus protection programs or other security related programs.

In general, accessing process 214 may be any process that has appropriate functionality to access protected parameters 210 and/or functionality to invoke a protected process 212. Accessing process 214 may be a benign process, such as a process that is instigated by a user, a non-malicious program or process, or an operating system process, etc. Alternatively, accessing process 214 may be a malicious process, such as a virus, a Trojan horse, a malicious script, etc. Accessing process 214 may also be a process that was not designed to access protected parameters 210 and/or processes 212, but which does so due to programming error, either directly or by proxy.

In general, parameter monitoring module 216 monitors protected parameters 210 for changes and take various other actions, described below, when such changes have been detected. The precise manner in which parameter monitoring module 216 monitors protected parameters 210 will vary based on such things as the format of protected parameters 210, the type of computer-readable media in which protected parameters 210 are stored, the type of operating system employed by the computing device 110, and/or the type of data structure or structures in which the protected parameters 210 are stored.

For example, and without limitation, in one implementation protected parameters 210 comprise system configuration parameter stored in a hierarchical data structure (e.g., a registry) that is managed by the Windows XP® operating system from Microsoft® Corporation of Redmond, Wash. In such a case, the parameter monitoring module 216 may monitor the protected parameters 210 using one of the functions (e.g., the "RegNotifyChangeKeyValue" function) provided by the operating system for managing the registry. In other implementations other mechanisms may be used to monitor for changes to protected parameters 210, including other functions provided by other operating systems or other available process or functions.

Protected parameters 210 that are monitored by parameter monitoring module 216 may be either static or dynamic. That is, the identity or location of protected parameters 210 may be "hardwired" in the parameter monitoring module 216 or it may be changeable. For example, parameter monitoring module 216 may contain or have associated therewith a data structure that specifies the identity or location of protected parameters 210. In such a case, the identity or location of protected parameters 210 may be changed by some secure mechanism within or outside of computing device 110. For example, the identity or location of protected parameters 210 may be changed by policy manager module 224 or by policy module manager 224 under instructions from external policy manager 228, each of which is described below.

Included in the actions that may be taken by protected parameter module 216 upon the detection of a change to a protected parameter or parameters is informing challenge module 220 regarding the changes, so that challenge module 220 may present a challenge or take some other action. Other modules that may be notified by parameter module 216 regarding a change to a protected parameter or parameters are log module 226, cost module 222, and policy module.

Additionally, parameter monitoring module 216 may also restore changed parameters to their original, pre-changed values. The manner in which parameter monitoring module 216 restores values of changed protected parameters 210 will vary based on such things as the format of protected parameters 210, the type of computer-readable media in which protected parameters 210 are stored, the type of operating system employed by computing device 110, and/or the type of data structure or structures in which the protected parameters 210 are stored.

For example, in accordance with one implementation, parameter monitoring module 216 stores one or more previous values of various protected parameters 210 in a data structure. When requested, such as by challenge module 220 or cost module 222, to restore one or more protected parameters 210 to a pre-change value or values, parameter monitoring module 216 restores the value of the changed parameter or parameters to a stored pre-changed value.

In operation, process monitoring module 218 monitors the calling or invocation of protected processes 212 in computing device 110 and may take various other actions, described below, when the calling or invocation of protected processes 212 has been detected. Additionally, process monitoring module 218 may prevent the calling of, or interrupt the execution of, protected processes 212 when appropriate, such as when a challenge has been failed. The precise manner in which process monitoring module 218 monitors the invocation of protected processes 212 and prevent the calling of, or interrupt the execution of, protected processes 212 will vary based on such things as, without limitation, the type or types of processes monitored by the process monitoring module 218 and/or the type of operating system used in computing device 110.

For example, the operating system of computing device 110 may provide mechanisms for monitoring and/or controlling processes. In such a case, process monitoring module 218 may use these mechanisms for monitoring and/or controlling protected processes 212. Alternatively, protected processes 212 may be "hooked" to provide such monitoring and/or controlling functionality to process monitoring module 218. For example, operating system APIs that have functionality for modifying configuration information may be hooked to call back to the process monitoring module 218 whenever they are called. In a more particular example, such as when the operating system is the Windows XP® operating system from Microsoft® Corporation of Redmond, Wash., the RegSetValueEx function may be hooked to call back to the process monitoring module 218 whenever it is called.

Protected processes 212 that are monitored by process monitoring module 218 may be either static or dynamic. That is, the identity of protected processes 212 may be "hard-wired" in the protected processes module or it may be changeable. For example, process monitoring module 218 may contain or have associated therewith a data structure that specifies the identity of protected processes 212. In such a case, the identity of protected processes 212 may be changed by some secure mechanism within or outside of computing device 110. For example, the identity of protected processes 212 may be changed by policy manager module 224 or by policy module manager 224 under instructions from external policy manager 228, each of which is described below.

Included in the actions that may be taken by processes monitoring module 218 upon the detection of calls to or invocations of protected processes 212 is informing challenge module 220 of such calls or invocations, so that challenge module 220 may present a challenge or take some other action. Other modules that may be notified by process monitoring module 218 regarding such calls or invocations are log module 226, cost module 222, and policy module.

In operation, challenge module 220 presents challenges to a user of computing device 110 via one or more output devices 126 of computing device 110 upon notice from parameter monitoring module 216 that one or protected parameters 210 have been changed or upon notice from process monitoring module 218 that one or protected processes 212 have been called or invocated. In accordance with some implementations, challenge module 220 presents a challenge to a user of computing device 110 whenever a message is received from parameter monitoring module 216 that a protected parameter 210 has been changed, or whenever a message is received from process monitoring module 218 that a protected process 212 has been call or invoked. In accordance with other implementations, challenge module 220 presents a challenge to a user of computing device 110 bases on instructions from cost module 222 or based on some policy, as received from policy module 224.

Challenges presented to a user of the computing device 110 by challenge module 220 will typically include a presentation phase and a response phase. In the presentation phase, some form of human discernable information is presented to the user, such as via output devices 126. In the response phase, a response to the challenge may be received from the user, or no response may be received, for example via an input device 124. Based on this response, or lack of response, challenge module 220 determines whether a human correctly responded to the presented human discernable information.

The information that is presented to the user in the presentation phase by challenge module 220 will typically include a puzzle and puzzle directions. In general, a puzzle comprises information that the user of computing device 110 is asked to recognize or respond to in some way. Puzzle directions instruct the user as to the manner in which the user should respond to the puzzle. In some implementations, the puzzle and the puzzle directions are presented together, such as in a common window of a graphical user interface presented on a display of a computing device.

In other implementations, the puzzle and the puzzle directions may be presented separately, such as in different windows and/or at different times. In some implementations, puzzle directions are not explicitly presented to the user. Rather, in some implementations, the manner in which the user is to respond to the puzzle may be inferred by the content, form, or presentation of the puzzle. In some implementations, the information presented in the presentation phase also includes warning information, which describes protected parameters 210 that has been modified or protected processes 212 that are being invoked and/or the consequences of modifying protected parameters 210 or invoking protected processes 212.

Typically, the puzzle that is presented to the user by challenge module 220 will include visual information (a "visual puzzle") or audio information (an "audio puzzle"). For example, a visual puzzle may include a series of letters or numbers that are obscured and/or contorted in some way that makes automated optical character recognition (OCR) difficult, but which are not obscured and/or contorted to such an extent that a human user cannot recognize them. As another example, a visual puzzle may include one or more images that are obscured, contorted, or rearranged in some way to make them difficult for an automated process to recognize. As another example, a visual challenge may comprise an image based or textual puzzle that is designed to be easily solved by a human, but difficult to solve by an automated process.

An audio puzzle may include, for example, an audible word or phrase that is presented to a user. In such cases, the user may be asked to type the word or phrase in a text box presented on a display device of the computing device. In another example of an audio puzzle, a user is presented with a question and asked to enter the answer to the question in text box presented on a display device of the computing device.

Figure 3:
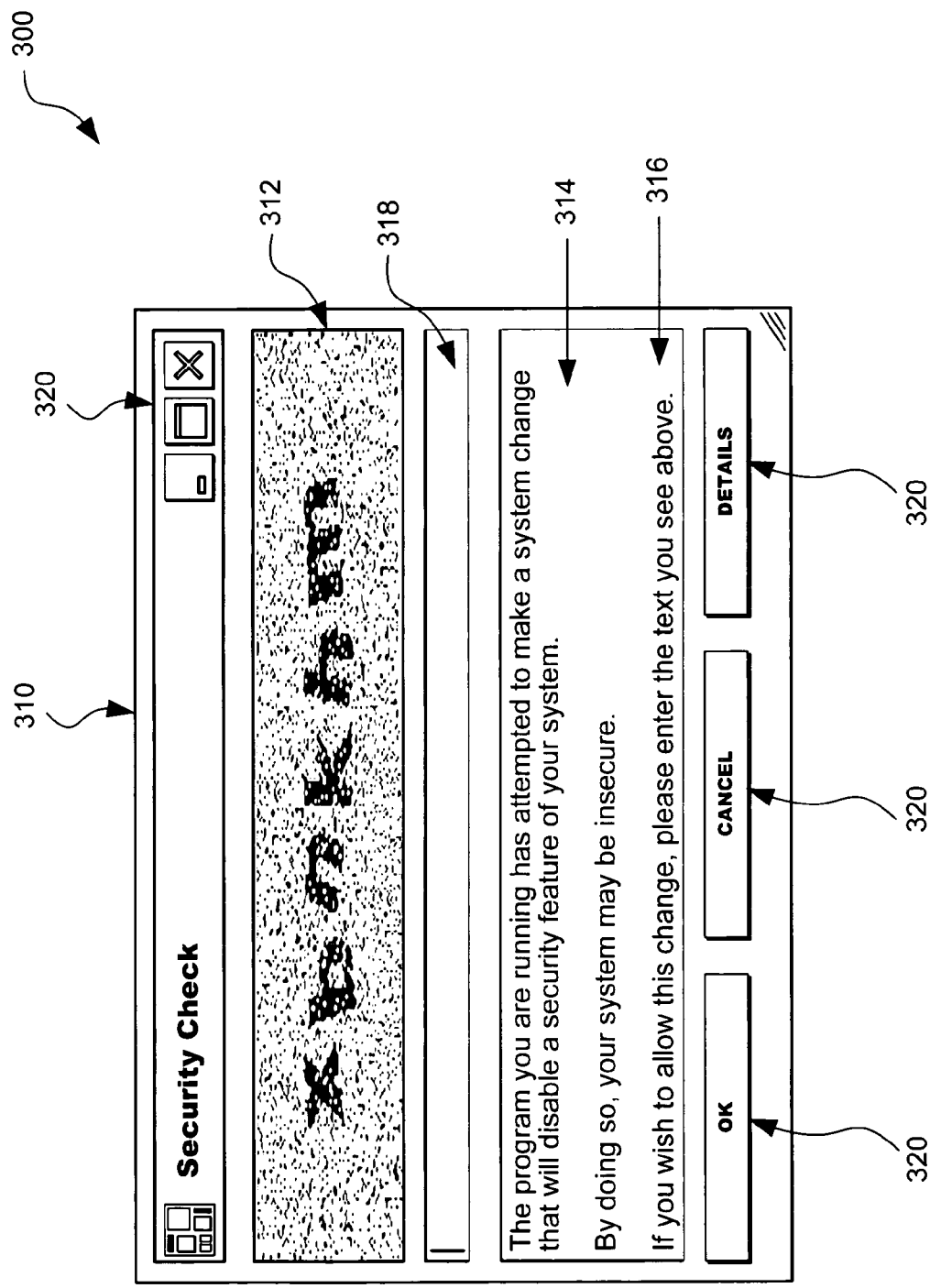
FIG. 3 illustrates one example of a challenge that may be presented by the parameter protection module of FIG. 2.

FIG. 3 illustrates one example of information 300 that may be presented to the user in the presentation phase by challenge module 220. As shown, in this implementation, the information 300 that is presented to the user comprises a window 310 of a graphical user interface (GUI). Included in the window 310 is a visual puzzle 312, warning information 314, puzzle directions 316, an answer input box 318, as well as various GUI controls 320.

Returning to FIG. 2, in operation, log module 226 stores information related to previous actions and activities in the system 200. For example, log module 200 may store a history of changes made to protected parameters 210, a history of invocations of protected process 212, and/or various other historical information related to the operation of parameter protection module 208. Typically, log module 226 stores information in a data structure in computer-readable in computing device 110. In some implementations, log module 226 presents or provides its stored information to policy module 224, which in turn may send the information to the external policy manager for analysis.

In general, cost module 222 operates in conjunction with challenge module 220 in implementing a credit based scheme, wherein challenges are presented to a user of computing device 110 only when some predetermined condition or conditions have been met. For example, in one implementation, each protected parameter 212 or process 214 is assigned a credit cost. Each time one of the protected parameters 212 or processes 214 are modified during a given session or time period, the credit cost of the protected parameter 212 or process 214 is added to a parameter modification cost. When the parameter modification cost exceeds a credit threshold, the challenge module 220 presents a challenge to the user of the computing device.

The credit costs associated with protected parameters 210 may be identical for all protected parameters 210 or may different for individual protected parameters 210 or groups of protected parameters. For example, and without limitation, protected parameters 210 or groups of protected parameters may have different costs based on the impact individual protected parameters or groups of protected parameters have on overall security of computing device, relative to one another. In some implementations, credit costs and the credit threshold may be set and/or adjusted by policy module 224. Further details regarding the functionality of cost module 222 is discussed below with respect to FIGS. 4 and 5.

Policy module 224 performs various operations related to modifying the functionality other modules 216-222 and 226 in parameter protection module 208. For example, and without limitation, policy module 224 may include functionality for interacting with parameter monitoring module 216 to change the protected parameters 212 that are monitored by parameter monitoring module 216. Likewise, policy module 224 may include functionality for interacting with process monitoring module 218 to change the protected processes 212 that are monitored by process monitoring module 218. As another example, policy module 224 may include appropriate functionality for changing or specifying the particular challenges that are presented by challenge module 220 and/or for specifying conditions that are to be met before a challenge is presented. As yet another example, policy module 224 may include appropriate functionality for changing or specifying the particular processes that are used by cost module 222.

Figure 4:
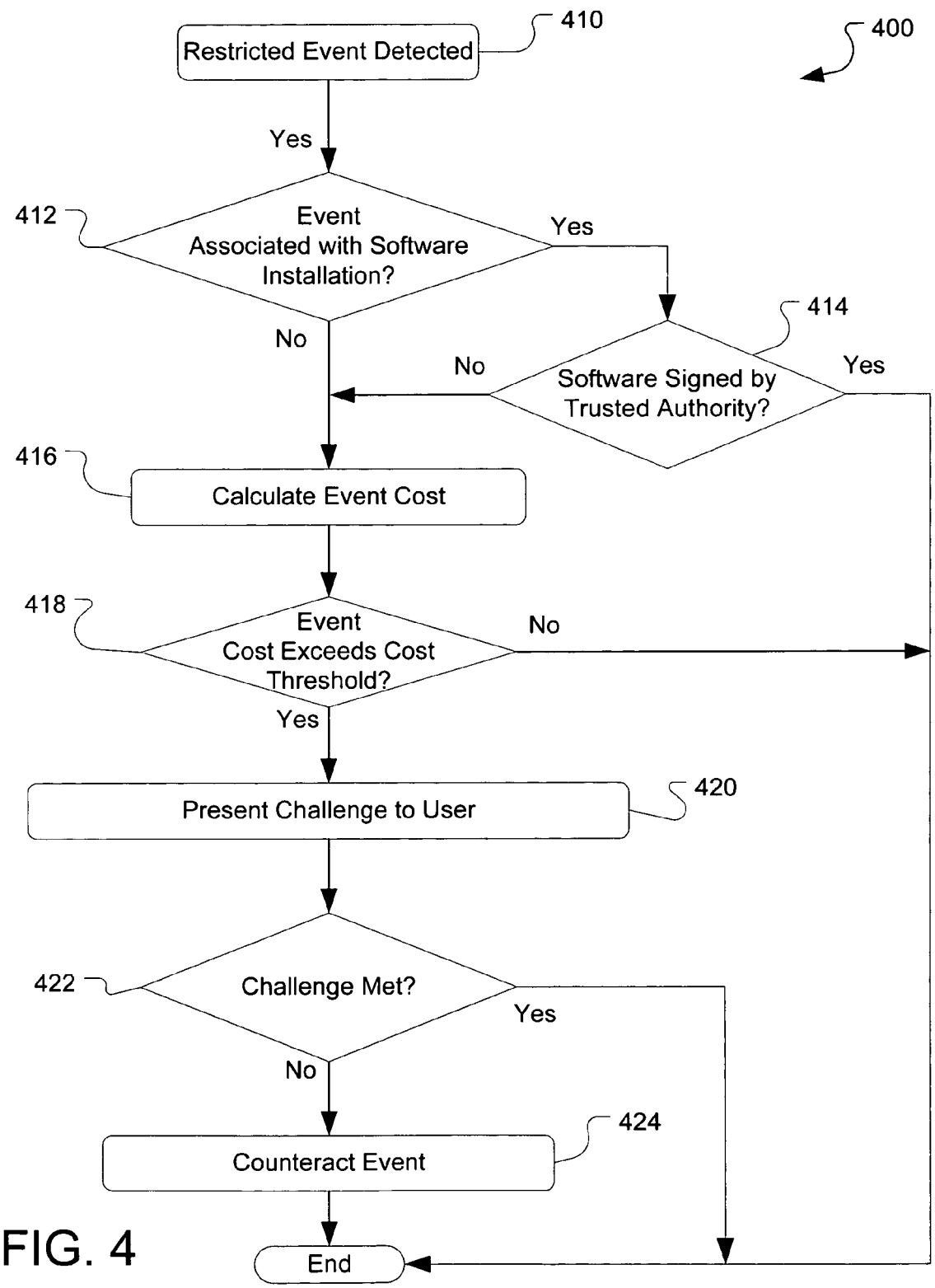
FIG. 4 illustrates one example of an operational flow illustrating various operations that may be carried by the parameter protection module of FIG. 2.
Figure 5:
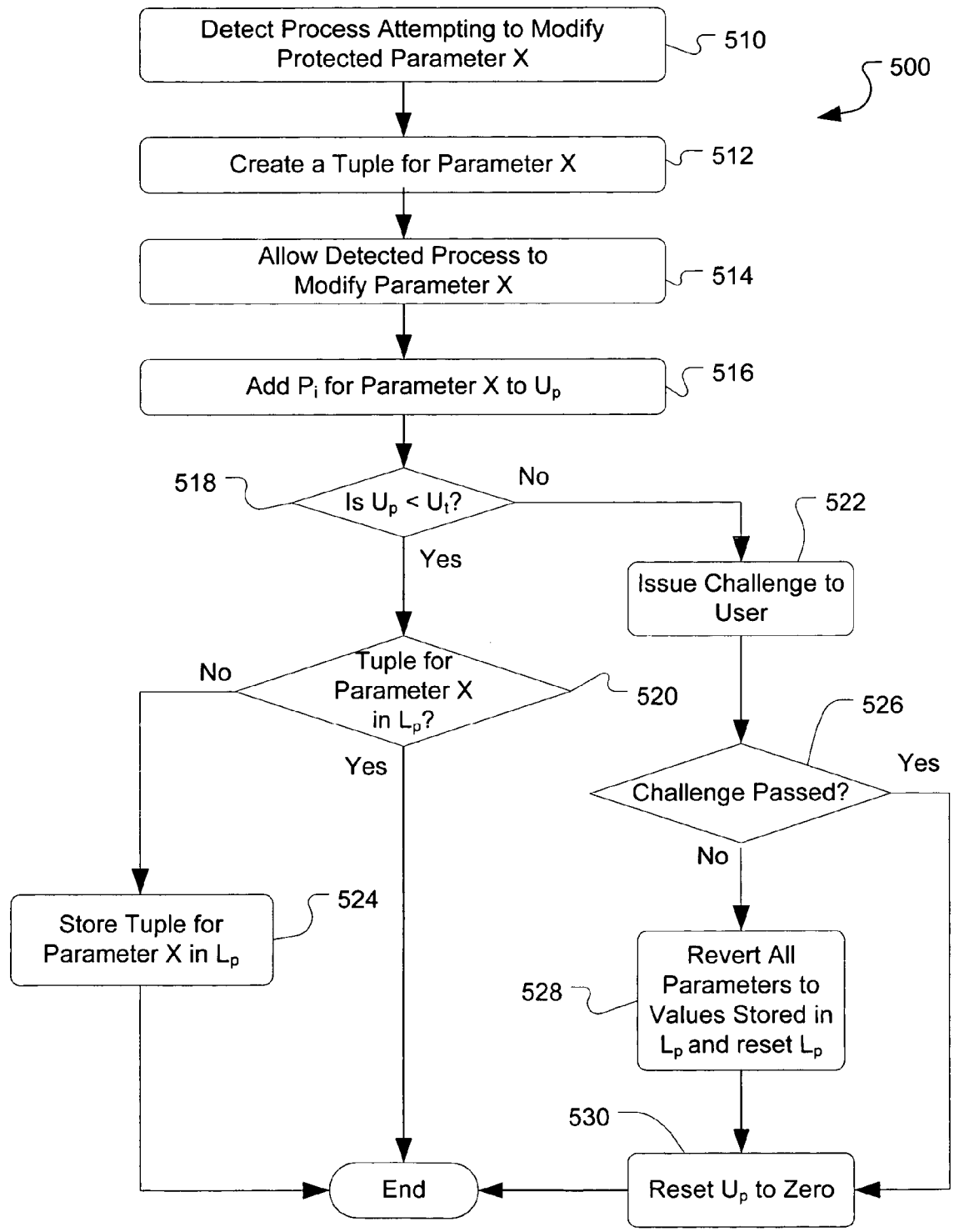
FIG. 5 illustrates one example of an operational flow illustrating various operations that may be carried by the parameter protection module of FIG. 2.

Turning now to FIGS. 4 and 5, illustrated therein are operational flows including various operations that may be carried out in preventing or mitigating changes to protected parameters in computing device 110. The following descriptions of FIGS. 4 and 5 are made with reference to computing device 110 of FIG. 1 and system 200 of FIG. 2. However, it should be understood that the operational flows set forth in FIGS. 4 and 5 are not intended to be limited to being performed by system 200, or in computing device 110. Any of the operational flows set forth in FIGS. 4 and 5, or any individual operations described in these operational flows, may be implemented, in various other systems, including distributed systems. While each of the operational flows illustrated in FIGS. 4 and 5 indicate a particular order of operation execution, in other implementations the operations may be ordered differently. Furthermore, in various implementations, one or more of the operations illustrated in the operational flows set forth in FIGS. 4 and 5 maybe be optional.

FIG. 4 illustrates an operational flow 400 including various operations that may be carried by system 200 in response to a detection or occurrence of a restricted event in computing device 110. As used here, a restricted event comprises either a change to protected parameter 210 or an invocation or call of a protected process 214.

In response to the detection of a restricted event, an installation determination operation 412 determines whether the restricted event is associated with the installation of software. If installation determination operation 412 determines that the restricted event is associated with the installation of software, operational flow 400 proceeds to a trust determination operation 414. If installation determination operation 412 determines that the restricted event is not associated with the installation of software, operational flow 400 proceeds to a cost calculation operation 416.

Trust determination operation 414 determines whether the software being installed is signed by a trusted authority. If trust determination operation 414 determines that the software being installed is signed by a trusted authority, the operational flow 400 ends. If trust determination operation 414 determines that the software being installed is not signed by a trusted authority, the operational flow operational flow 400 proceeds to cost calculation operation 416.

Cost calculation operation 416 calculates a parameter modification cost based on credit costs associated with one or more restricted events 410 that have occurred in the computing device. For example, in one implementation, each detected event 410 is assigned a credit cost. Each time a restricted event is detected, calculation operation 416 sums the credit costs of the detected restricted events to obtain the modification cost. Alternatively, calculation operation 416 may keep a running total of the credit costs associated with restricted events are added as they occur. As described below with respect to respect to FIG. 5, cost calculation operation may use various other algorithms to determine parameter modification cost.

Threshold determination operation 418 determines whether the parameter modification cost calculated by cost calculation operation exceeds a credit threshold. If threshold determination operation 418 determines that the parameter modification cost does not exceed the cost threshold, operational flow 400 ends. If threshold determination operation 418 determines that the parameter modification cost does exceed the cost threshold, operational flow 400 proceeds to challenge operation 420.

Challenge operation 420 presents a user of the computing device a challenge, such as the challenges described above with respect to challenge module 200. Next, a challenge met determination operation 422 determines if the challenge has been answered by a human. If challenge met determination operation 422 determines that the challenge has been answered by a human, operational flow 400 ends. If challenge met determination operation 422 determines that the challenge has not been answered by a human, operational flow continues to counteract operation 424.

Counteract operation 424 takes some prescribed operation to counteract the actions of the detected restricted event 410. The action taken by counteract operation 424 depends on the form of the detected restricted event 410. For example, and without limitation, if restricted event changed a protected parameter from a first value to a second value, counteract operation 424 may change the parameter back to the first value. As another example, if the restricted event invoked or attempted to invoke a protected process, counteract operation 424 may stop the protected process or prevent the invocation of he protected process. Following counteract operation 424, operational flow 400 ends.

FIG. 5 illustrates an operational flow 500 including various operations that may be carried by system 200 when protected process is detected trying to modify a protected parameter. In one implementation, without limitation, operations 522 and 524 of operational flow 500 are carried out by challenge module 220, while the remaining operations of operational flow 500 are carried out by cost module 222.

In accordance with some implementations, prior to the detection of the process attempting to modify the protected parameter, a number of initialization processes are carried out (e.g., by cost module 222). Included in the initialization processes is a credit cost initialization process, a change list ($L_p$) creation process, a credit threshold ($U_t$) initialization process, and/or a parameter modification cost ($U_p$) initialization process.

During the credit cost initialization process, credit costs ($P_i$) are associated with each protected parameter 210 for use in the operational flow 500. In some implementations, the credit costs ($P_i$) are set according to a policy (e.g., by instructions from policy module 224). In some implementations, any protected parameters 210 that have not specifically been assigned a credit costs may be assigned a nominal credit cost ($P_{default}$). In some implementations, the credit costs for each protected parameter are stored in secure storage. In some implementations, the credit cost initialization process occurs following startup of computing device 110.

During the change list initialization process, an empty change list is created for use in the operational flow 500. As described below, the change list ($L_p$) is used to hold change tuples, each of which includes the identity and original values of a changed protected parameter (e.g., <parameter identifier, old parameter value>). In some implementations, the change list ($L_p$) is stored in secure storage. In some implementations, the change list initialization process occurs following startup of computing device 110.

During the credit threshold initialization process, a credit threshold value ($U_t$) is set for use in the operational flow 500. The credit threshold may be the same for each user of computing device 110, or it may be different for different users. In some implementations, the credit threshold value ($U_t$) is stored in secure storage. In some implementations, the change list ($L_p$) is stored in secure storage. In some implementations, the credit threshold initialization process occurs following the logging in of a user to computing device 110.

During the parameter modification cost initialization process, a parameter modification cost value ($U_p$) is set to zero. In some implementations, the parameter modification cost value ($U_p$) is stored in secure storage. In some implementations, the parameter modification cost initialization process occurs following the logging in of a user to computing device 110. As will be described below, the parameter modification cost initialization process may also occur during the operational flow 500.

As shown in FIG. 5, operational flow 500 begins upon the detection of an attempt by a protected process 212 to modify a protected parameter (i.e., Parameter X) 510. Following the detection of the attempt 510 to modify Parameter X, a tuple creation operation creates a tuple for Parameter X and stores the tuple in temporary storage.

Next, a modification operation 514 allows the protected process to modify the Parameter X. A cost accumulation operation 516 then determines a new parameter modification cost ($U_p$) based, at least in part, on the credit cost ($P_i$) associated with Parameter X. Cost accumulation operation 516 may determine new parameter modification costs ($U_p$) in a number of ways. For example, in one implementation, cost accumulation operation 516 simply adds the credit costs ($P_i$) associated with Parameter X to the parameter modification cost ($U_p$) to create a new parameter modification cost ($U_p$). In other implementations, cost accumulation operation 516 may determine a new parameter modification cost ($U_p$) based on the credit costs ($P_i$) and one or more other algorithms or policies. For example, and without limitation, cost accumulation operation 516 may use a leaky bucket, a token bucket algorithm, or some other rate control algorithm, to determine the parameter modification cost ($U_p$).

Following cost accumulation operation 516, a determination operation 518 then determines of the parameter modification cost ($U_p$) exceeds the credit threshold value ($U_t$). If it is determined at operation 518 that the parameter modification cost ($U_p$) exceeds the credit threshold value ($U_t$), operational flow 500 proceeds to tuple determination operation 520. However, if it is determined at operation 518 that the parameter modification cost ($U_p$) does not exceed the credit threshold value ($U_t$), operational flow 500 proceeds to challenge operation 522.

At tuple determination operation 520, a determination is made as to whether a tuple for Parameter X already exists in the change list ($L_p$). If it is determined at operation 520 that a tuple for Parameter X already exists in the change list ($L_p$), operational flow 500 ends. However, if it is not determined at operation 520 that a tuple for Parameter X already exists in the change list ($L_p$), operational flow 500 proceeds to tuple storage operation 524.

At tuple creation operation 524, the tuple for Parameter X that is stored in temporary storage is stored in the change list ($L_p$), and the operational flow 500 ends.

At challenge operation 522, a challenge is issued to the user of computing device 210. In accordance with one implementation, the challenge that is presented to the user will include a "visual puzzle" and/or an "audio puzzle," as described above. In other implementations, other puzzles may be presented.

Following challenge operation 522, a challenge determination operation 526 determines whether the challenge issued at challenge operation 522 was passed. As used here, a passed challenge is a challenge that was answered correctly. In contrast, a challenge that was not passed was either answered incorrectly or not answered at all.

If it is determined at challenge determination operation 526 determines that the challenge issued at challenge operation 522 was passed, operational flow 500 proceeds to reset operation 530. However, if it is determined at challenge determination operation 526 determines that the challenge issued at challenge operation 522 was not passed, operational flow 500 proceeds revert operation 528.

At revert operation 528, any protected parameters 210 that have a corresponding tuple in change list ($L_p$) are reverted to the values contained in their corresponding tuple. Following revert operation 528, operational flow proceeds to reset operation 530.

At reset operation 530, the parameter modification cost ($U_p$) is reset to zero. Following reset operation 530, the operational flow 500 ends.

In accordance with one alternative implementation of operational flow 500, to avoid a full audit of security parameters, $P_{default}$ may be set to some unit value. Every time a protected parameter is updated, $P_i$ is then incremented by $P_{default}$. If any $P_i$ exceeds some threshold $P_g$ set by group policy, the parameter identifier can be forwarded by policy module 224 to a group administrator, following a challenge. The administrator may then decide whether this parameter is security critical or not, and send back an adjusted $P_i$ to all users in the administrative group by group policy. The same mechanism may be used to set $U_t$ dynamically. In such a case, $P_i$ values may be dynamically calculated or fixed. If $U_p$ exceeds some threshold $U_g$ set by group policy, the parameter value list $L_p$ may be forwarded by policy module 224 to a group administrator following a challenge. The administrator may then decide whether the $L_p$ is too long or too short for the level of security required, and push down a fixed $U_t$ to all users in the administrative group by group policy.

Although some particular example implementations have been illustrated in the accompanying drawings and described in the foregoing Detailed Description, it will be understood that the subject matter described herein is not limited to the particular implementations described. Rather, the subject matter described herein is capable of numerous rearrangements, modifications and substitutions without departing from the spirit set forth and defined by the following claims. Accordingly, the scope of the present invention should not be limited by the particular example implementations discussed above, but should be defined only by the claims set forth below and equivalents thereof.

What is claimed is:

1. A method comprising:
    determining that a system configuration parameter of a computing device has been modified from a first state to a second state;
    determining whether the system configuration parameter is protected;
    if it is determined that the system configuration parameter is designated as protected, presenting to a user of the computing device a message including human-discernable information that is obscured from detection by a computer-implemented process;
    requesting from the user an action that indicates recognition of the human-discernable information; and
    if the user does not perform the requested action, returning the system configuration parameter to the first state.

2. The method of claim 1, wherein determining that the system configuration parameter has been modified from a first state to a second state comprises:
    receiving an indication from an operating system of the computing device that the system configuration parameter has been modified.

3. The method of claim 1, wherein determining whether the system configuration parameter is protected comprises:
    consulting a list of protected system configuration parameters.

4. The method of claim 1, wherein determining whether the system configuration parameter is protected comprises:
    determining whether the system configuration parameter has been modified as a result of the installation of software authenticated using a digital certificate; and
    if it is determined that the system configuration parameter has been modified as a result of the installation of software authenticated using a digital certificate, determining that the system configuration has not been protected.

5. The method of claim 1, wherein determining whether the system configuration parameter is designated as restricted comprises:
    determining whether the system configuration parameter has been modified as a result of the installation of software by a trusted source; and
    if it is determined that the system configuration parameter has been modified as a result of the installation of software by a trusted source, determining that the system configuration has not been protected.

6. The method of claim 1, wherein the human-discernable information that is obscured from detection by a computer-implemented process comprises visually distorted letters and/or numbers.

7. The method of claim 1, wherein the human-discernable information that is obscured from detection by a computer-implemented process comprises an audio message including sounds selected to prevent accurate identification of the message by a computer-implemented process.

8. The method of claim 1, wherein the message includes information indicating use in the computing device of the system configuration parameter.

9. A method comprising:
    in response to the occurrence of a restricted event in a computing device, presenting to a user of the computing device a challenge including information designed to assist in determining whether the challenge is answered by a human;
    determining whether the challenge was answered by a human; and
    if it is determined that the challenge was not answered by a human, counteracting the restricted event, wherein the restricted event comprises a call to a specified Application Programming Interface (API) to modify a system configuration parameter and wherein counteracting the restricted event comprises preventing the API from modifying the system configuration parameter.

10. The method of claim 9, wherein the restricted event comprises modifying a system configuration parameter of the computing device from a first state to a second state and wherein counteracting the restricted event comprises returning the system configuration parameter to the first state.

11. The method of claim 9, wherein the challenge comprises a puzzle and puzzle directions.

12. The method of claim 9, wherein the challenge comprises a visual challenge.

13. The method of claim 9, wherein the challenge comprises an audio challenge.

14. One or more computer-readable media embodying computer-executable instruction that, when executed by a computer, cause the computer to implement a method comprising:
    detecting a request to modify a system configuration parameter of a computing device;
    in response to detecting the request, determining whether the system configuration parameter is protected;
    if it is determined that the system configuration parameter is protected, presenting to a user of the computing device a human-discernable a message including information that is obscured from detection by a computer-implemented process;
    requesting from the user an action that indicates recognition of the information; and
    if the user does not perform the requested action, preventing modification of the system configuration parameter.

15. The method of claim 14, wherein detecting a request to modify select configuration information of the computing device comprises:
    determining whether a call has been made to a specified Application Programming Interface (API) to modify the system configuration parameter.

16. The method of claim 14, wherein determining whether the system configuration parameter is protected comprises:
    determining whether the request to modify the system configuration parameter has been made in conjunction with the installation of software that is signed by a trusted authority; and if it is determined that the request to modify the system configuration parameter has been made in conjunction with the installation of software that is signed by a trusted authority, determining that the system configuration parameter is not protected.

17. The method of claim 14, wherein determining the system configuration parameter is protected comprises:
   determining whether the request to modify the system configuration parameter has been made in conjunction with installing software according to a predefined group policy; and
   if it is determined that the request to modify the system configuration parameter has been made in conjunction with installing software according to a predefined group policy, determining that the system configuration parameter is not protected.

18. The method of claim 14, wherein the human-discernable information that is obscured from detection by a computer-implemented process comprises visually distorted letters and/or numbers.

19. The method of claim 14, wherein the message includes information indicating use in the computing device of the system configuration parameter.

* * * * *